(12) United States Patent
Kang et al.

(10) Patent No.: US 8,810,583 B2
(45) Date of Patent: Aug. 19, 2014

(54) APPARATUS AND METHOD FOR CREATING ANIMATION FROM WEB TEXT

(75) Inventors: Bo-gyeong Kang, Seoul (KR); Hyun-ju Shim, Seoul (KR); Seung-eun Song, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 681 days.

(21) Appl. No.: 12/724,093

(22) Filed: Mar. 15, 2010

(65) Prior Publication Data

US 2010/0238180 A1    Sep. 23, 2010

(30) Foreign Application Priority Data

Mar. 17, 2009  (KR) .................. 10-2009-0022640

(51) Int. Cl.
*G06T 13/00*    (2011.01)

(52) U.S. Cl.
USPC ........................................................ 345/473

(58) Field of Classification Search
CPC ................................ G06T 13/40; G06T 13/00
See application file for complete search history.

(56) References Cited

U.S. PATENT DOCUMENTS

| | | | |
|---|---|---|---|
| 5,805,832 A * | 9/1998 | Brown et al. ..................... 711/1 |
| 2002/0154124 A1* | 10/2002 | Han .............................. 345/473 |
| 2005/0033747 A1* | 2/2005 | Wittkotter ........................ 707/10 |
| 2005/0171964 A1* | 8/2005 | Kulas ............................ 707/100 |
| 2006/0197764 A1* | 9/2006 | Yang ............................. 345/473 |
| 2006/0217979 A1 | 9/2006 | Pahud et al. |
| 2008/0215310 A1 | 9/2008 | Audant |
| 2010/0082345 A1* | 4/2010 | Wang et al. .................... 704/260 |

FOREIGN PATENT DOCUMENTS

| | | |
|---|---|---|
| JP | 09-167165 | 6/1997 |
| JP | 09-167521 | 6/1997 |
| JP | 11-232274 | 8/1999 |
| JP | 2008-107904 | 5/2008 |
| JP | 2008-123131 | 5/2008 |
| KR | 10-2002-0041379 | 6/2002 |
| KR | 10-2004-0020933 | 3/2004 |
| KR | 10-2004-0028038 | 4/2004 |
| KR | 10-2004-0036282 | 4/2004 |
| KR | 10-2004-0106960 | 12/2004 |
| KR | 10-2006-0066588 | 6/2006 |
| KR | 10-2008-0066361 | 7/2008 |
| WO | WO 03/001413 | 1/2003 |
| WO | WO-2008/096099 A1 | 8/2008 |
| WO | WO 2008/148211 | 12/2008 |

OTHER PUBLICATIONS

Hyunju Shim, et al., "Web2Animation—Automatic Generation of Storytelling 3D Animation from Web Texts," *In Proc. of the 2009 IEEE/WIC/ACM International Joint Conference on Web Intelligence and Intelligent Agent Technology*, Sep. 15-18, 2009, pp. 595-601, vol. 1, IEEE Computer Society, Washington, D.C., USA.

(Continued)

*Primary Examiner* — Edward Martello
(74) *Attorney, Agent, or Firm* — NSIP Law

(57) ABSTRACT

An apparatus and method for creating animation from a web text are provided. The apparatus includes a script formatter for generating a domain format script from the web text using a domain format that corresponds to a type of the web text, an adaptation engine for generating animation contents using the generated domain format script, and a graphics engine reproducing the generated animation contents in the form of an animation.

33 Claims, 10 Drawing Sheets

(56) References Cited

OTHER PUBLICATIONS

Chua et al., "From Text Description to Animation Sequences," *In Proceedings of Computer Animation '96*, Jun. 3-4, 1996, Geneva, Switzerland, pp. 175-183.

Shim et al., "Web2Animation: Automagic Generation of 3D Animation from the Web Text," *IEEE/WIC/ACM International Conference on Web Intelligence and Intelligent Agent Technology*, Sep. 15-18, 2009, Milano, Italy, pp. 596-601.

Summons to Attend Oral Proceedings mailed Mar. 12, 2014 in counterpart European Application No. 10156467.2.

Hsu, Jane Yung-jen, et al. "Template-Based Information Mining from HTML Documents." AAAI/IAAI. 1997.

Kessler, Brett, et al. "Automatic detection of text genre." Proceedings of the 35th Annual Meeting of the Association for Computational Linguistics and Eighth Conference of the European Chapter of the Association for Computational Linguistics. Association for Computational Linguistics, 1997.

Chua et al., "From Text Description to Animation Sequences," *In Proceedings of Computer Animation '96*, Jun. 3, 1996-Jun. 4, 1996, Geneva, Switzerland, pp. 175-183.

Piwek et al., "Generating Multimedia Presentations from Plain Text to Screen Play," *Speech and Language Processing: Intelligent Multimodal Information Presentation*, 2005, vol. 27, Dordrecht: Springer, pp. 1-23.

Shim et al., "Web2Animation: Automagic Generation of 3D Animation from the Web Text," *IEEE/WIC/ACM International Conference on Web Intelligence and Intelligent Agent Technology*, Sep. 15, 2009-Sep. 18, 2009, Milano, Italy, pp. 596-601.

European Search Report issued on Aug. 20, 2010, in corresponding European Application No. 10156745.1 (13 pages).

European Search Report issued on Aug. 20, 2010, in corresponding European Application No. 10156467.2 (11 pages).

\* cited by examiner

APPARATUS AND METHOD FOR CREATING ANIMATION FROM WEB TEXT

CROSS REFERENCE TO RELATED APPLICATION

This application claims the benefit under 35 U.S.C. §119(a) of Korean Patent Application No. 10-2009-0022640, filed on Mar. 17, 2009, in the Korean Intellectual Property Office, the entire disclosure of which is incorporated herein by reference for all purposes.

BACKGROUND

1. Field

The following description relates to an animation producing apparatus and method, and more particularly, to an apparatus and method for extracting features from domains and creating animation based on the extracted features.

2. Description of the Related Art

In an Internet system, users may share contents in the form of text and images. This is because text and images may be easily transmitted, shared, and retrieved.

Despite these advantages of text, various domains on the web use image media to deliver information more efficiently and to attract more attention. Because animation delivers information in audio and visual forms, it not only delivers information but also is more entertaining than text and provides a more effective communication method in comparison to plain images and/or text.

In addition, with the advancement of information devices and network performance, user needs for creating, retrieving, and sharing media images have increased. Thus, various methods are being suggested to provide a device that allows users to create animation and to solve problems that arise when contents are shared such as network overload.

SUMMARY

In one general aspect, there is provided an apparatus for creating animation from a web text, the apparatus including a script formatter for generating a domain format script from the web text using a domain format that corresponds to a type of the web text, an adaptation engine for generating animation contents using the generated domain format script, and a graphics engine reproducing the generated animation contents in the form of an animation.

The animation contents may include media style information that includes at least one of style of animation, environment information that includes information about objects and settings appearing in the animation, and a scenario script that is generated based on the environment information.

The script formatter may generate the domain format script such that image data from the web text is associated with text from the web text.

The adaptation engine may make inferences based on one or more predefined rules and update the scenario script and the environment information using the result of the inferences.

The adaptation engine may include an adaptation engine manager for controlling a process of generating the animation contents, a text analysis unit for analyzing text included in the domain format script, an animation content generation unit for generating the animation contents based on the analyzed text, and a rule manager for adding detail to the animation contents using inferences made based on one or more predefined rules.

The animation content generation unit may include a scenario generation unit for generating a scenario script used to create animation, a presentation style generation unit for generating media style information that indicates a style of the animation, and an environmental element setting unit for generating environmental element setting information about objects and settings that appear in the animation.

The scenario generation unit may generate the text included in the domain format script into dialog sentences.

The scenario generation unit may send a query about sentence elements omitted from the analyzed text to the rule manager, and the rule manager may infer the omitted sentence elements and send inferred sentence elements to the scenario generation unit.

If environmental element setting information corresponding to the inferred sentence elements has not been set by the environmental element setting unit, the environmental element setting unit may update previously set environmental element setting information to include the inferred sentence elements.

When the analyzed text contains a compound verb, the scenario generation unit may generate the scenario script by converting the compound verb into a series of two or more actions.

The apparatus may further include a user interface for allowing a user to enter a theme for the web text, and the adaptation engine may generate the animation contents based on the theme set by the user.

In another general aspect, there is provided a method of creating animation from a web text, the method including generating a domain format script from the web text using a domain format that corresponds to a type of the web text, the generating includes extracting and classifying data of the web text according to the domain format, generating animation contents using the generated domain format script, and reproducing the generated animation contents.

The animation contents may include media style information that includes a style of animation, environment information that includes information about objects and settings appearing in the animation, and a scenario script that is generated based on the environment information.

The domain format script may be generated such that image data included in the web text is associated with text data included in the web text.

The generating of the animation contents may include analyzing text included in the domain format script, and generating the animation contents based on the analyzed text including adding details to the animation contents using a result of inferences made based on one or more predefined rules about the scenario script.

The generating of the animation contents may include generating the scenario script based on environment information, generating the result of inferences made based on the predefined rules, and updating the scenario script and the environment information based on the generated result of inferences.

The generating of the result of inferences may include inferring sentence elements omitted from the analyzed text based on the one or more predefined rules.

The generating of the result of inferences may include inferring that the analyzed text includes a compound verb and converting the compound verb into a series of two or more actions.

The method may further include providing a user interface to receive a request for creating animation from web text, and receiving the request for creating animation from web text.

The user interface may include an icon used to input the request for creation of animation from web text and a theme icon that allows a user to select a theme.

In still another general aspect, there is provided an apparatus for creating animation, including a script formatter for determining a domain format type of a web text, extracting and classifying elements from the web text according to the domain format, and generating a domain format script according to the extracted and classified elements, an adaption engine for receiving the domain format script and generating a scenario script and animation elements, and a graphics engine to generate an animation using the scenario script and the animation elements generated by the adaption engine.

The adaption engine may generate the domain format script by processing the domain format script according to a first domain format type, and processing the domain format script a second time according to a scenario domain format to further illustrate the extracted and classified elements.

The first domain format type may include one of a blog domain, a news domain, a recipe domain, a diary domain, and a social network environment domain.

The web text may include one or more tags indicating the domain format type, and the script formatter determines the domain format type based upon the one or more tags.

The apparatus may further include a user interface for allowing a user to enter a theme for the web text, wherein the adaptation engine may generate the scenario script and animation elements based on the theme set by the user.

The adaption engine may include a text analysis unit for analyzing text included in the web text and extracting sentence elements of the text using text analyzers, an animation content generation unit for generating animation contents based on the analyzed text, and a rule manager that includes knowledge of ontology and relations of the analyzed text and for controlling the animation content generation unit to generate contents based on the analyzed text.

The animation content generation unit may send a query to the rule manager requesting omitted sentence elements, the rule manager may infer sentence elements that have been omitted and send them to the animation content generation unit, and the animation content generation unit may add detail to the animation contents based on the inferred sentence elements.

The apparatus may further include a storage unit storing one or more predefined rules that are used by the rule manager, wherein the rule manager may infer sentence elements that have been omitted based upon the predefined rules stored in the storage unit.

The animation content generation unit may include an element setting unit for setting information about objects and settings that appear in the animation, a presentation style generation unit for generating media style information that indicates a style of the animation and that may be used to convert the scenario script into animation, and a scenario generation unit that converts text included in the web text into dialog sentences.

Other features and aspects may apparent from the following description, the drawings, and the claims.

Figure 1:
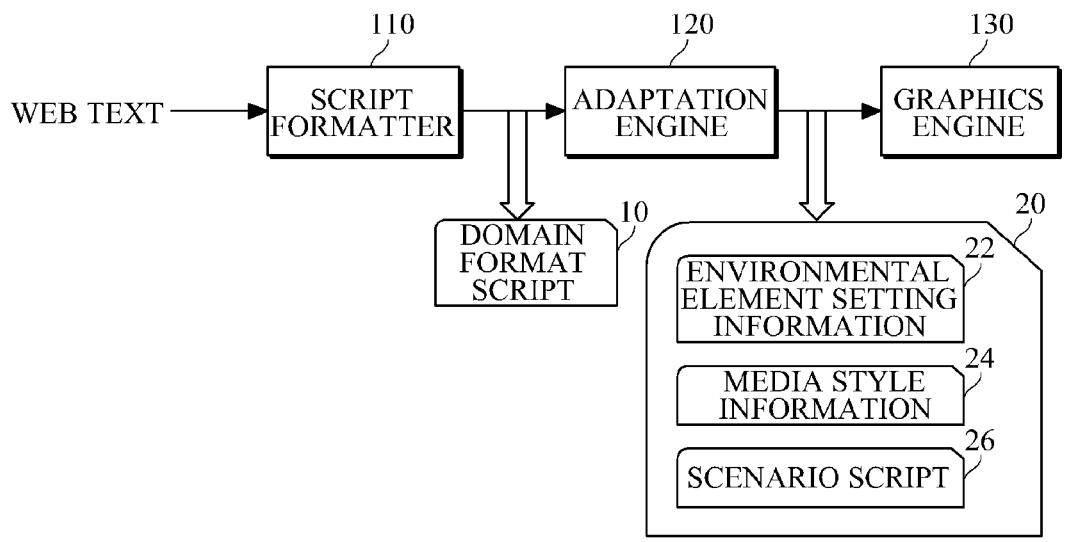
FIG. 1 is a diagram illustrating an example of an apparatus for creating animation from web text.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses and/or systems described herein may be suggested to those of ordinary skill in the art. Also, descriptions of well-known functions and constructions may be omitted for increased clarity and conciseness.

FIG. 1 illustrates an example of an apparatus for creating animation from web text. Referring to FIG. 1, the apparatus includes a script formatter 110, an adaptation engine 120, and a graphics engine 130. As described herein, web text refers to information that consists of, for example, text information, video information, image information, media information, web info, and the like.

The script formatter 110 generates a domain format script 10 from web text using a domain format that corresponds to the type of web text. Data contained in the web text may be extracted and classified according to the domain format. The web text type may be specified in tag information of a web source or may be determined by the script formatter 110 using a method to detect a web template.

Generally, web text includes an image and text related to the image. The text related to the image may be placed before or after the image. The script formatter 110 may generate the domain format script 10 such that image data from among the data contained in the web text is associated with text related to that image data. A domain format refers to a structure in which the text and image contents in the specified domain are presented.

The structure of the domain format may be determined by the type and/or category of web text. A domain format may have a different data structure according to the type of web text. Examples of domain formats include but are not limited to, a recipe format, a diary format, news format, a scenario format, a blog, and the like. After the web text is processed based on a domain format that corresponds to the type of the web text, the domain format script 10 is generated. The domain format script 10 is a script which may include text and image contents reconfigured into a domain format that can be understood by a computer. The domain format script 10 may be expressed in one or more computer languages, for example, an extensible markup language (XML) format, a hypertext markup language (HTML) format, and the like.

Information related to the type of the web text may be extracted and utilized by the script formatter 110. In some embodiments, the same noun may have different meanings. For example, the same noun may be classified as an ingredient in a recipe format and as a journalist's report in a news format.

The adaptation engine 120 receives the domain format script 10 and determines a scenario script and animation elements. The scenario script has a structure that may be understood by the graphics engine 130. The adaptation engine 120 may set values of the animation elements. The animation elements are entities used to create an animation. The animation elements include, for example, one or more of settings, properties, characters, presentation elements, and the like. The presentation elements include, for example, one or more of lighting, camera walks, sound effects, characters' facial expressions, characters' actions, computer graphics (CG), and the like.

The adaptation engine 120 receives the domain format script 10 and generates animation contents 20. The animation contents 20 may include environmental element setting information 22, media style information 24, and/or scenario script information 26, about settings and objects.

For example, the environmental element setting information 22 may include setting information about physical environments, for example, settings, characters, properties, and the like, to appear in the animation. The media style information 24 includes information indicating the style of the animation such as abstract setting values of presentation elements that are to be reflected in the scenario script 26. The media style information 24 may include values indicating, for example, one or more of the genre, rhythm, atmosphere, and the like, of the animation. The media style information 24 may include setting values that indicate, for example, the personality, the role, the habits of a character, and the like. The media style information 24 may include setting values that indicate, for example, one or more of the presentation elements such as initial camera walks and background music.

The scenario format may be one of the domain formats that is used by the script formatter (110) when the type of the web text is a scenario. The scenario script 26 is the script that is processed based on the scenario format. The scenario script 26 may have, for example, an XML format. A scenario format may include, for example, characters, lines, actions, narration, environment elements, input media clips such as music files and image files, and the like, as illustrated in the example shown in FIG. 5.

Figure 3:
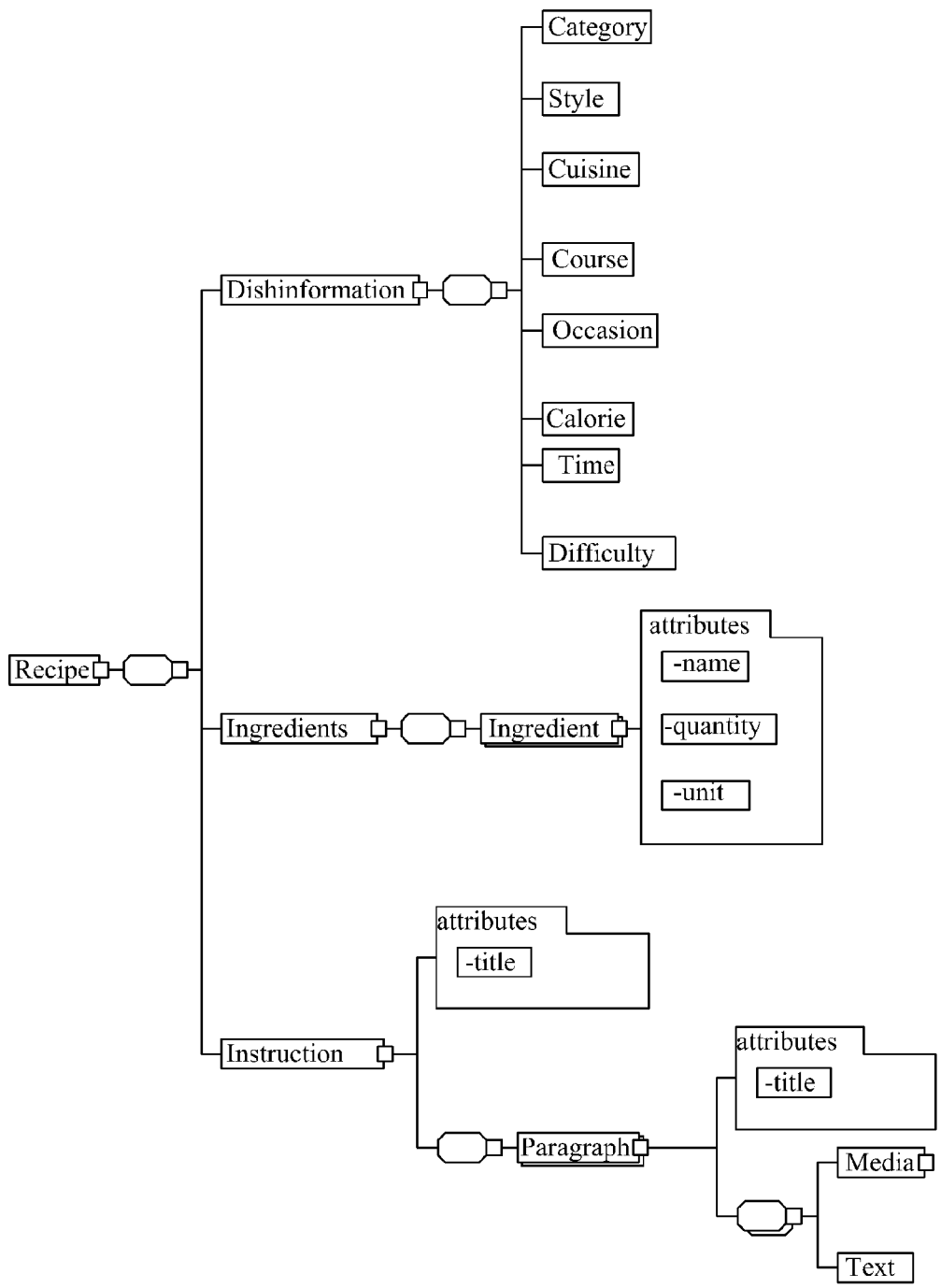
FIG. 3 is a diagram illustrating an example of a recipe domain format.

When the type of the web text is not a scenario, the web text may be processed based on a domain format that corresponds to the type of the web text. The processed web text may be processed again based on the scenario format. As a result, the scenario script 26 may be generated. For example, when the type of the web text is a recipe, the web text may be processed based on a recipe format as illustrated in FIG. 3. The processed web text may then be converted into the scenario script 26 based on the scenario format.

When the type of the web text is a scenario, the scenario script generated by the script formatter 110 may be a domain script that includes original data processed in the web text using the scenario format, itself. A scenario script 26 generated by the adaptation engine 120 may include the original data included in the web text and also include, for example, data containing inference results.

The adaptation engine 120 may generate the scenario script 26 such that the scenario script 26 includes dialog in the form of letters, words, and/or sentences. The dialog sentences may be created, for example, based on a predefined rule. The information containing the process of adding detail to actions may include a process of converting each compound verb into actions. For example, the adaptation engine 120 may generate the scenario script 26 based on the environment information and update the scenario script 26 and/or the environment information using the inference results.

In some embodiments, for example, a user may select a theme, and the adaptation engine 120 may generate the animation contents 20 based on the theme selected by the user. A theme refers to a theme that may be set by a user and web text that may be converted into animation based on the theme. For example, in the case of a cooking show, a user may be provided with themes such as a simple dish and a luxury dish. When the user selects the simple dish, the animation contents 20 may be generated to represent a process in which one character makes a simple dish provided in web text using, for example, simple ingredients available at home. As another example, when a user selects the luxury dish theme, the animation contents 20 may be generated to represent a process in which a character makes a dish, for example, with more luxurious ingredients and utensils, in a lavish environment such as a luxury restaurant.

The graphics engine 130 may reproduce animation using the environment element setting information 22, the media style information 24, and/or the scenario script 26. The graphics engine 130 may generate an animation script, which includes animation elements, for example, camera walks and lighting, in addition to the scenario script 26, and may reproduce the generated animation script. In this example, the animation script describes and expresses animation elements in a structured manner.

Figure 2:
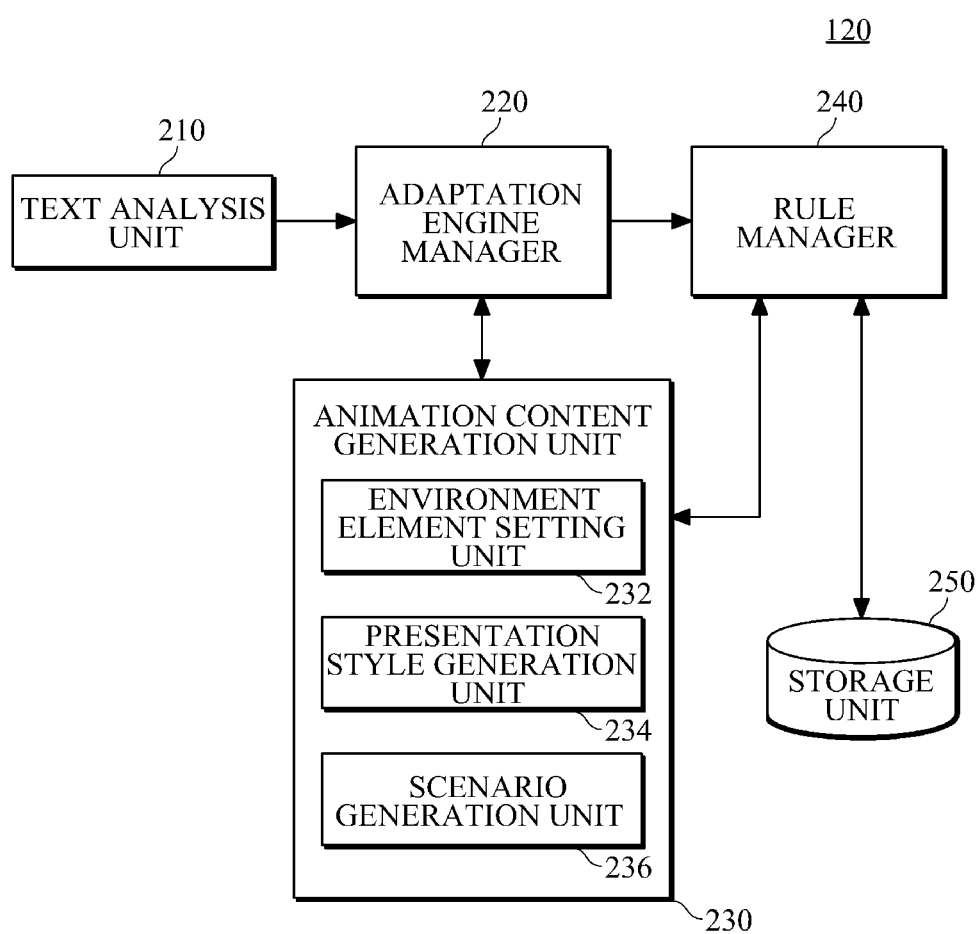
FIG. 2 is a diagram illustrating an example of an adaptation engine included in the apparatus of FIG. 1.

FIG. 2 illustrates an example of an adaptation engine that may be included in the apparatus of FIG. 1.

Referring to FIG. 2, the adaptation engine 120 includes a text analysis unit 210, an adaptation engine manager 220, an animation content generation unit 230, a rule manager 240, and a storage unit 250. Adaptation operations performed by the adaptation engine 120 include the operation of analyzing text and tagging the analysis results to sentence elements of the text, and the operation of making inferences using the analysis results based on facts and predefined rule information.

To control the process of generating animation contents, the adaptation engine manager 220 schedules the operations of the text analysis unit 210, the animation content generation unit 230, the rule manager 240, and the storage unit 250. The adaptation engine manager 220 may control the animation content generation unit 230 to generate animation contents based on the text analysis results of the text analysis unit 210. In some embodiments, the adaptation engine manager 220, along with the rule manager 240, may control the animation content generation unit 230 to generate animation contents based on the text analysis results of the text analysis unit 210.

The text analysis unit 210 analyzes text included in a domain format script. The text analysis unit 210 extracts sentence elements of the text using text analyzers, for example, a morpheme analyzer, a semantic parser, and the like. For example, the text analysis unit 210 may conduct a morpheme analysis and a syntax analysis to obtain information about a subject, a verb, an object, and the like, in a sentence. The text analysis unit 210 may generate text analysis results by tagging the obtained information to the sentence elements.

The animation content generation unit 230 generates animation contents based on the analyzed text. When the animation content generation unit 230 generates animation contents, the rule manager 240 may make inferences based upon one or more predefined rules and send the inference results to the animation content generation unit 230. The inference results may be used to add detail to the animation contents. For example, the animation content generation unit 230 may send, to the rule manager 240, a query about omitted sentence elements that may be used to generate animation contents. Accordingly, the rule manager 240 may make inferences based on one or more predefined rules about the generation of the animation contents and send the inference results to the animation content generation unit 230. For example, the rule manager 240 may make inferences of dialog missing or omitted from the web text. The missing dialog may include, words, phrases, expressions, actions, and the like. Based upon the predefined rules, the rule manager 240 may determine the missing dialog and transfer the missing dialog as inferred sentence elements to the animation content generation unit 230.

The storage unit 250 stores applications that may be used by the adaptation engine 120 and stores one or more predefined rules that may be used by the rule manager 240. The predefined rules may include an ontology, for example, a dictionary including words used in a semantic web and relationships between the words. The rule manager 240 includes the knowledge of ontology and relations. In response to requests from the units included in the adaption engine 120, the rule manager 240 returns elements for environment settings, action sequences, missing objects or tools, and the like.

For example, in a recipe format, an instruction of "chop carrots" may be received. The adaption engine 120 may request missing elements from the rule manager 240. In response, the rule manager 240 may infer the missing elements and send an action sequence to the adaption engine 120, for example, an action of "walk to the sink," "grip knife," and "chop carrots." In doing so, the rule manager 240 may further complete the task of "chop carrots" to include an action of a character using a sink, a knife, and an action of chopping the carrots, in a 3-D animation of movement.

Hereinafter, the configuration and operation of an example animation content generation unit will be described. In this example, the animation content generation unit 230 includes an environmental element setting unit 232, a presentation style generation unit 234, and a scenario generation unit 236.

The environmental element setting unit 232 sets environmental element setting information about objects and settings that appear in an animation. For example, when words, such as carrot, canned food, and fruit, are input to the environment element setting unit 232, they may be classified as ingredients of a dish, based on a morpheme analysis and/or a syntax analysis.

The environmental element setting unit 232 may assign property values to three-dimensional (3D) elements corresponding to these ingredients. The environmental element setting unit 232 may set information, which includes the property values used to identify properties and locations of the properties on the screen, as initial environmental element setting information. For example, when a character is indicated by a theme that a user selected or a character is defined at an abstract level as a "simple dish," the environmental element setting unit 232 may set the character based on a rule, for example, that only one cook is used in a "simple dish" theme.

When a collective noun, such as fruit, is input to the environmental element setting unit 232 as the text analysis result, the environmental element setting unit 232 may select an abstract property corresponding to the noun "fruit," for example, a fruit basket. In some embodiments, when the environmental element setting unit 232 cannot select a property that matches the text analysis result, it may preferentially select an available property that is similar to the input property using an ontology indicating an ingredient taxonomy provided by the rule manager 240. In some embodiments, the environmental element setting unit 232 may select a property that is most similar to a corresponding noun, based on the ontology. When no 3D object is available, the environmental element setting unit 232 may specify objects, such as properties, in text in a two-dimensional (2D) or 3D animation content space.

The presentation style generation unit 234 generates media style information which indicates the style of animation and which may be used to convert a scenario into an animation. While the environmental element setting unit 232 sets parameter values of physical environments, for example, settings, properties, and characters, the presentation style generation unit 234 sets parameter values of presentation elements, for example, atmosphere, lighting style, a character's voice, texture styles (antique, modern, etc.) of properties, and the like.

For example, in the case of a news format, if a user selects a comic news show as a theme, the presentation style generation unit 234 may set the voice of a male character cast for the show to "inarticulate" and set the overall action style of the male character to a comic style. The parameters of presentation elements related to a theme selected by a user may respectively be matched with media styles in advance, or may be dynamically generated by input values of external elements, for example, a current time, a user profile analysis, and the like. The rule manager 240 manages the rules such as those described above, in an integrated manner.

The scenario generation unit 236 generates a scenario script for creating animation. The scenario generation unit 236 may send a query about sentence elements omitted from analyzed text to the rule manager 240. In response to the query, the rule manager 240 may infer the omitted sentence elements.

The scenario generation unit 236 may convert text included in web text into dialog sentences. For example, the scenario generation unit 236 may generate dialog sentences by distributing contents written in descriptive sentences to the characters that are cast. The scenario generation unit 236 may distribute the contents to the characters based on the form of the statement, for example, a declarative, an interrogative, an exclamatory, and the like. The scenario generation unit 236 may distribute the contents to the characters based on the dialog, for example, a sentence unit, a length, a word of a sentence, and the like.

When text is input to the scenario generation unit 236, the scenario generation unit 236 may conduct a morpheme analysis and/or a syntax analysis of the input text. In addition, sentences, phrases, and words may be inserted into the input text based on an ad-lib rule that uses the form of the sentence or characteristics of the words, as condition information. Ad-libs are sentences, phrases, and words that do not exist in the domain format text and which are inserted into the domain format text to make dialogs flow more naturally. Examples of ad-libs include greetings, closing comments, exclamations, and the like. The operation of converting text included in web text into dialog sentences may be performed to produce an animation that is based upon the web text.

When the analyzed text includes a compound verb, the scenario generation unit 236 may convert the compound verb into two or more actions to generate the scenario script. For example, a phrase "chop and place the carrot" in a recipe domain may be converted into a series of actions, for example, "chop" and "place."

When the rule manager 240 sends inferred sentence elements to the scenario generation unit 236 in response to a query from the scenario generation unit 236, and the environmental element setting information corresponding to the inferred sentence elements has not been set by the environmental element setting unit 232, the environmental element setting unit 232 may update the previously set environmental element setting information to include the unset environmental element setting information.

For example, in a phrase "chop the carrot" in a recipe domain, the verb "chop" may be extracted as a main verb based on a morpheme analysis and/or a syntax analysis of the phrase. The extracted main verb may be used to add detail to the animation and may be sent to the rule manager 240 as a query value. Accordingly, the rule manager 240 may obtain information about cooking utensils from an ontology, for example, a knife that may be used to "chop" the carrot. The rule manager 240 may select a "knife" based on the obtained information.

If the subject of the action "chop" is omitted or not found, the rule manager 240 may search the ontology for information, for example, entities that may serve as the subject of the action "chop" such as a "chef." Consequently, the scenario generation unit 236 may receive information (such as "knife" and "chef") omitted from the original text from the rule manager 240, reconstruct the phrase "chop the carrot" into a complete sentence "Chef "A" chops the carrots with a knife," and reflect the complete sentence in a scenario script, so that an animation of the subject "chef" performing the action "chop" with the cooking utensil "knife" may be created. In addition, if the properties corresponding to "knife" and "chef" have not been initially set by the environmental element setting unit 232, they may be additionally set.

When the apparatus for creating animation from web text is used, animation may be created from existing web text, for example, web text of various blogs. The animation may also be created according to the category of the web text. Thus, information may be delivered to users more efficiently. Because animation delivers information in audio and visual forms, it not only delivers information but also is more entertaining than text and may be more effective for those who may find it difficult to deal with text.

In the example of a cooking blog, for example, a user may participate in producing environmental element setting information, such as ingredients, cooking utensils, and restaurants, and provide a service based on a method of creating animation from web text. The cooking blog may be loaded into a cooking space. For example, the function of converting web text about a recipe into a cooking show and playing the cooking show may be loaded into a refrigerator, a monitor built in a sink, or the like.

Figure 4:
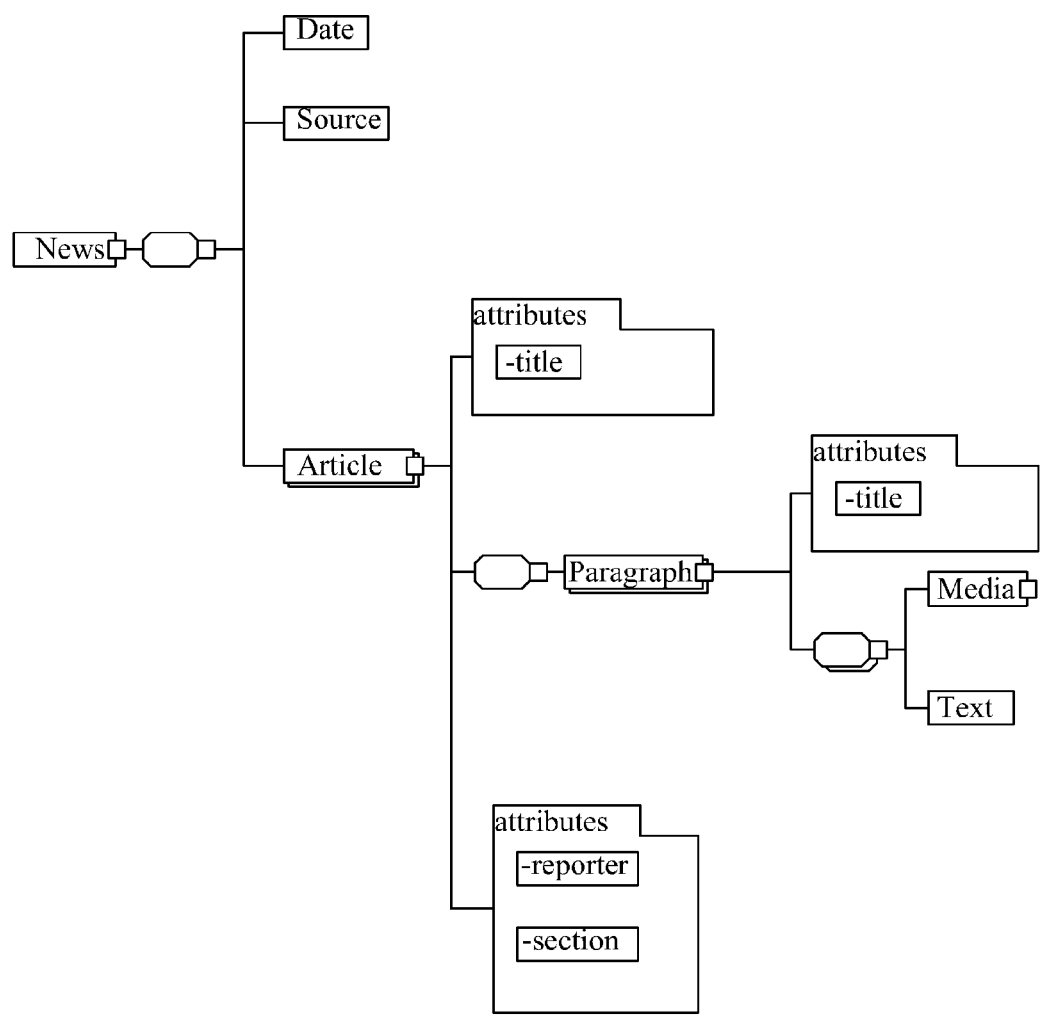
FIG. 4 is a diagram illustrating an example of a news domain format.
Figure 5:
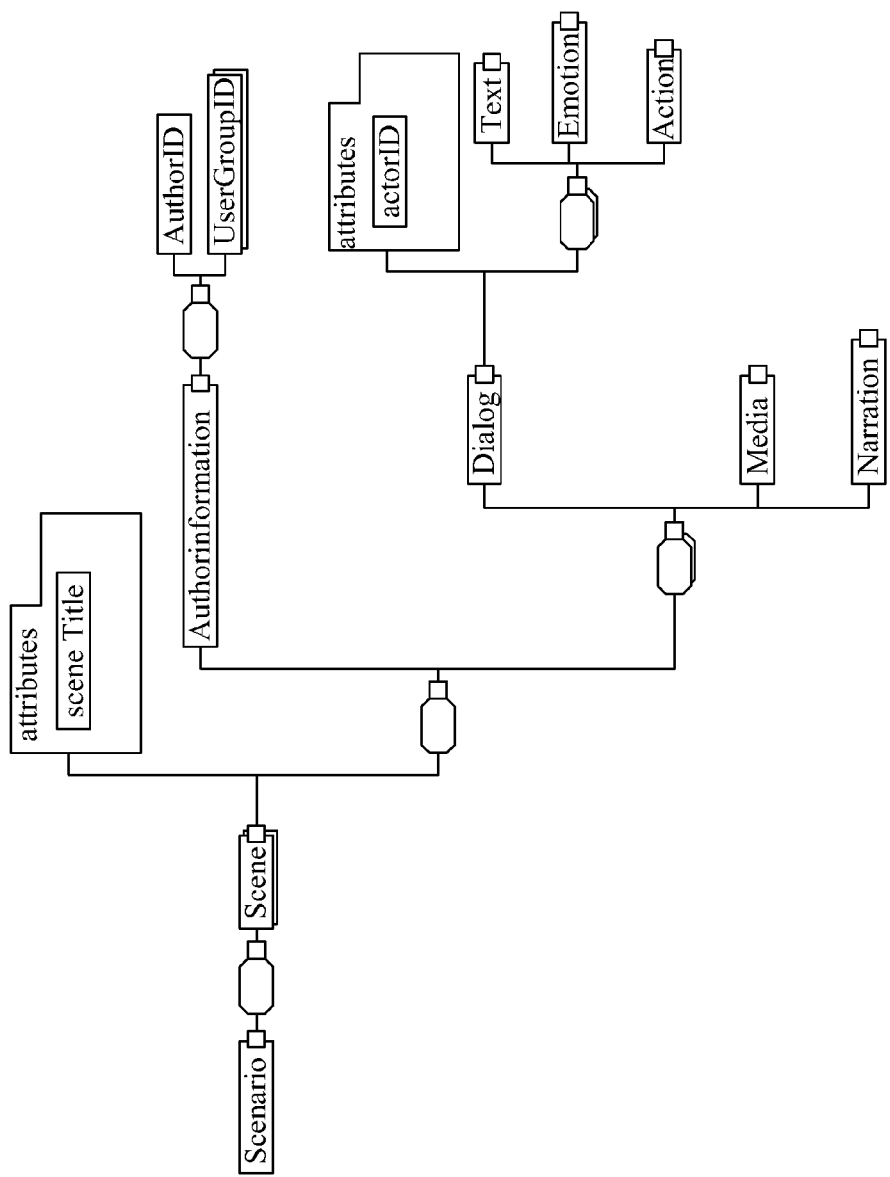
FIG. 5 is a diagram illustrating an example of a scenario domain format.

FIGS. 3-5 provide examples of domain formats that may be used with the apparatus for creating animation from web text. These domain formats are provided for purposes of example and are not meant to limit the scope of the domain formats that may be used with the apparatus for providing animation from web text. Any desired domain format may be used by the apparatus and methods described herein. For example, the domain format may include a journey, a blog, a review, a comment about goods or services, communication in a social network, and the like.

FIG. 3 illustrates an example of a recipe domain format. Referring to FIG. 3, in this example, "recipe" is a domain format including normalized contents about a recipe that includes data of "dish information," "ingredients," and "instruction" information.

For example, "dish information" may include "category" which indicates the type of a dish, "style" which indicates a cooking style, "cuisine" which indicates a cooking method such as roasting or steaming, "course" which indicates information about a main dish, dessert, and the like, "occasion" which indicates information about a time of year or event such as a particular season, Thanksgiving Day, Christmas or the like, and other information such as "calorie content", "preparation time", and "difficulty."

"Ingredients" may include information about the name and quantity of each ingredient. Also, "instruction" may include a description of a cooking process. Contents about the cooking process may include paragraphs, each consisting of text and media. Because each "paragraph" may include "text" and "media", information about the association between text and media included in original web text may be preserved. "Title" under "instruction" may specify a user-defined title, and "title" under "paragraph" may specify the subtitle of each paragraph.

FIG. 4 illustrates an example of a news domain format. Referring to FIG. 4, in this example, "news" is a data format including normalized contents about a newspaper article, a broadcast report, and the like, and may consist of data that includes "date," "source," and "article" information.

For example, "date" may indicate the date on which news or an article was written, and "source" may indicate the source of the news or the article. In addition, "article" may include the overall content of an article. "Title" under "article" may specify a user clip title, "reporter" may specify the name of a reporter, and "section" may specify the organization that the reporter works for.

Contents about an article may include paragraphs that consist of text and/or media, for example, images, moving images, sound, and the like. Because each "paragraph" may include "text" and "media," information about the association between text and media included in original web text may be preserved. "Title" under "paragraph" may specify the subtitle of given text.

FIG. 5 illustrates an example of a scenario domain format. Referring to FIG. 5, in this example, "scenario" is a data format including normalized contents about a movie script and may consist of a plurality of "scenes." "Scene title" may specify the title information of a scene in a scenario.

Each "scene" may consist of "author information", "dialog," "media," and "narration." "Author information" may be information about an author of a scene and may include "author ID" and "usergroupID" which indicates a group to which each author belongs.

In "dialog," "actor ID" may indicate an ID of an actor or actress that speaks his or her lines, expresses emotions, and carries out actions. "Dialog" may include a character's "text" (lines), "emotion" which includes the character's facial expressions, and "action." In addition, "media" may include information about media that are reproduced, and "narration" that includes information about a narrative.

Figure 6:
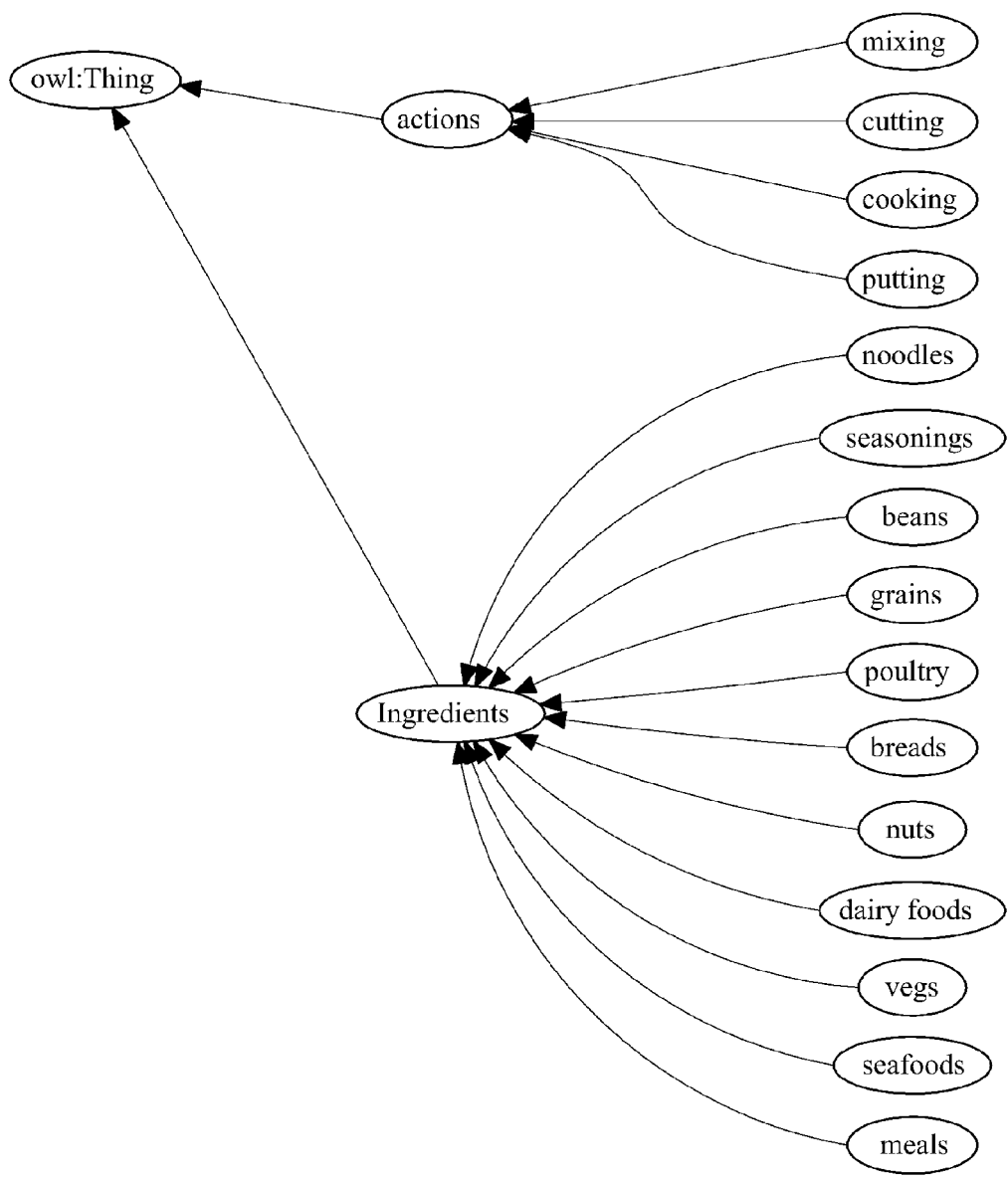
FIG. 6 is a diagram illustrating an example of a recipe domain ontology.

FIG. 6 illustrates an example of a recipe domain ontology including a taxonomy based on a recipe domain. The recipe domain ontology is an ontology that may include classification nodes that are used when web text is defined in a recipe format and may be converted into a cooking show animation. The recipe domain ontology may also include the relationship between the classification nodes. Because this taxonomy may be extensible, the node-relationship diagram and depth of the taxonomy may be changed according to the option of a producer.

Referring to FIG. 6, in this example, the recipe domain ontology may include "actions" and "ingredients." The recipe domain ontology may also include a dish type and a dish theme.

For example, "actions" may define properties needed for cooking actions which are determined by a user input, ingredients, additional actions needed for the cooking actions, and ad-libs using classification nodes and the relationships between the classification nodes. Referring to FIG. 1 and FIG. 2, the adaptation engine 120 may express a value of the defined properties as a character's actions and/or lines, by referring to the rule manager 240.

In addition, main ingredients and cooking actions may be determined based on the type of a dish determined by a user input. For example, the adaptation engine 120 may present additional effects and information for emphasizing the main ingredients and cooking actions through a character's lines, actions, and properties, with reference to the rule manager 240.

The adaptation engine 120 may refer to information such as settings, the appearance of a character, greetings, and the like, based on a dish theme determined from a user input. This information may be used to select media style parameters.

Figure 7:
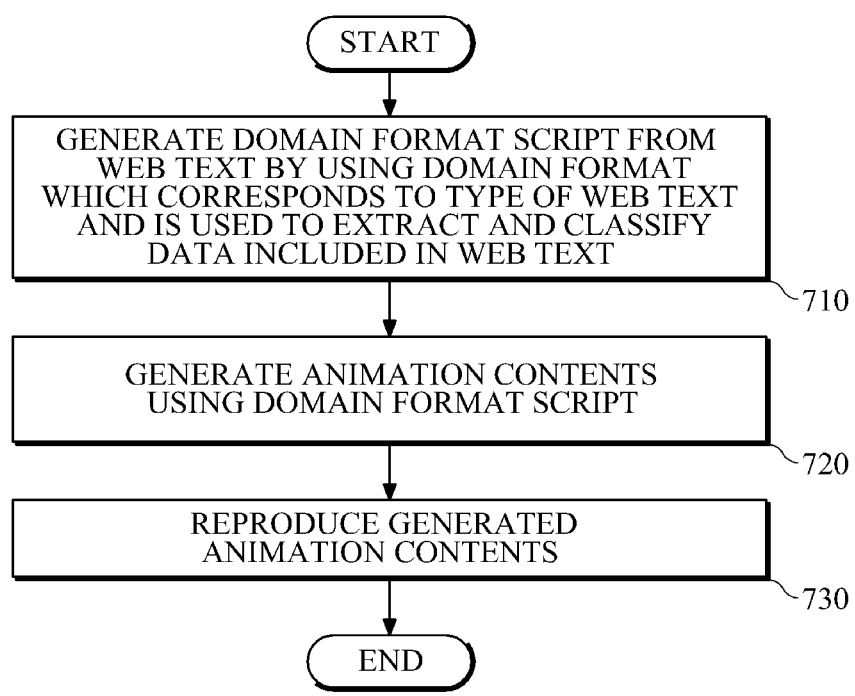
FIG. 7 is a flowchart illustrating an example of a method for creating animation from web text.

FIG. 7 illustrates an example of a method for creating animation from web text.

Referring to FIG. 7, in 710, web text is generated into a domain format script based on a domain format that corresponds to the type of the web text. Data included in the web text may be extracted and classified according to the domain format. For example, when the type of the web text is a recipe, a recipe format script may be generated by extracting and classifying data included in the web text based on the recipe domain format illustrated in FIG. 3.

In 720, animation contents are generated using the generated domain format script. The animation contents may include, for example, media style information that indicates the style of animation, environment information which includes environmental element setting information about objects and settings appearing in the animation, and a scenario script which is generated based on the environment information, and the like.

In 730, the animation contents are reproduced as an animation by a graphics engine.

Figure 8:
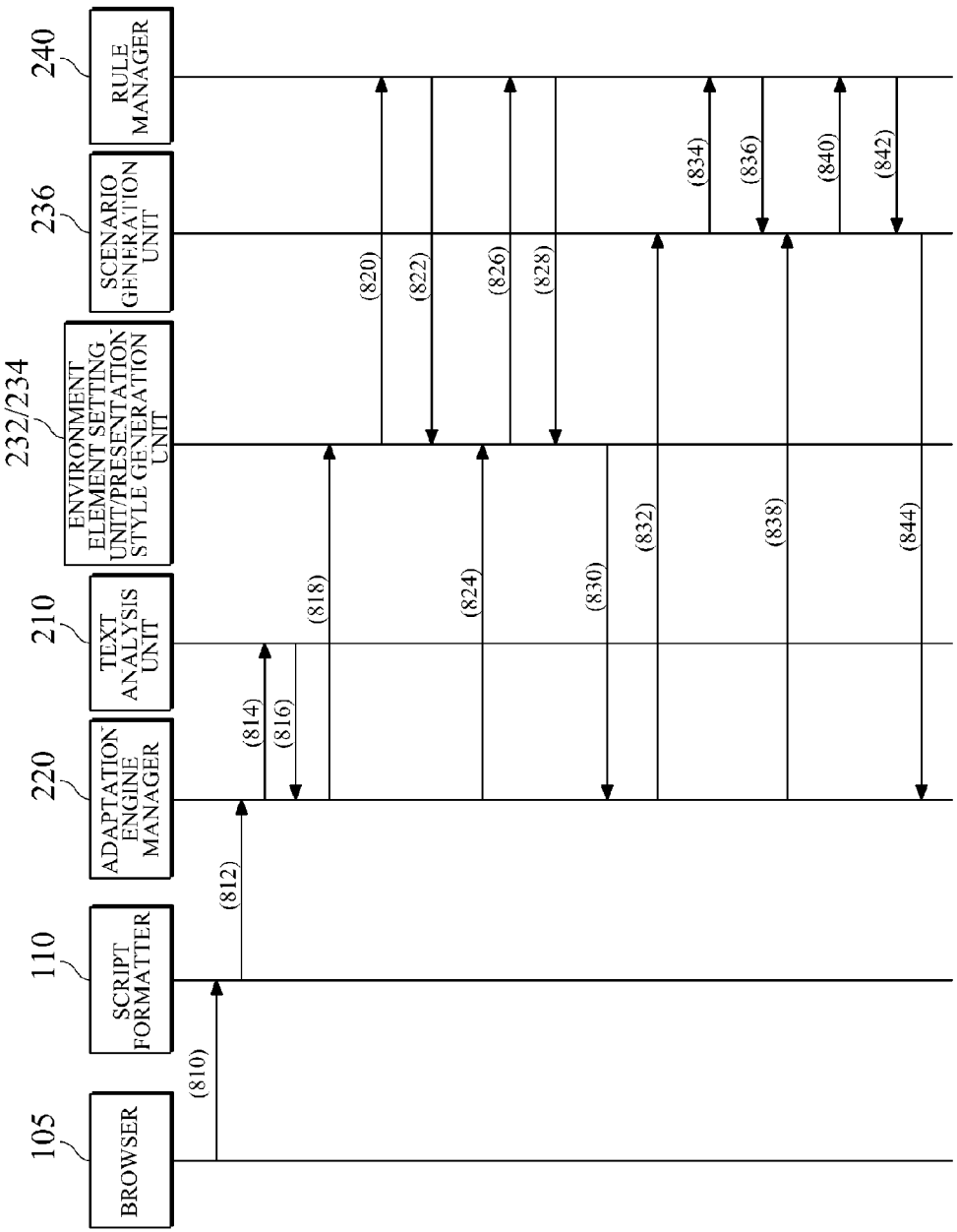
FIG. 8 is a flowchart illustrating an example of a process for generating animation contents.

FIG. 8 illustrates an example of a process for generating animation contents.

Referring to FIG. 8, in 810, a browser 105 sends web text to the script formatter 110. The script formatter 110 extracts data, such as text, images, and media, from the web text, and generates a domain format script based on a domain format that corresponds to the type of the web text. Examples of the domain format script include a recipe script, a news script, a diary script, and the like.

In 812, the script formatter 110 sends the generated domain format script to the adaptation engine manager 220. In 814, adaptation engine manager 220 requests that the text analysis unit 210 analyze text included in the domain format script. Accordingly, the text analysis unit 210 generates tags indicating the forms and meanings of text elements included in the analyzed text using, for example, natural language processing and a semantic parser. The text analysis unit 210 generates new text including the analyzed text and the generated tags. In 816, the text analysis result (i.e., the generated text) is sent to the adaptation engine manager 220.

In 818, the adaptation engine manager 220 requests that the environmental element setting unit 232 provide environmental element setting information, for example, parameters of settings, properties, characters, and the like. When a user inputs a desired theme, the adaptation engine manger 220 may request the environmental element setting unit 232 to provide environmental element setting information based on the input theme. In 820, the environmental element setting unit 232 sends a query about a rule for setting the environmental element setting information to the rule manager 240 In 822, the rule manager 240 obtains the rule for setting the environmental element setting information using a rule inference engine, for example, a Java expert system shell (JESS), and sends the obtained rule to the environmental element setting unit 232.

In 824, the adaptation engine manager 220 requests that the presentation style generation unit 234 select presentation style parameters. In 826, the presentation style generation unit 234 sends a query about presentation style parameters to the rule manager 240. In response to the query, in 828, the rule manager 240 obtains presentation style parameters, for example, based on inference results and sends the presentation style parameters to the presentation style generation unit 234.

In 830, the environmental element setting unit 232 and the presentation style generation unit 234, respectively, generate environmental element setting information and media style information based on the information received from the rule manager 240 and send the generated environmental element setting information and the generated media style information to the adaptation engine manager 220.

To generate a scenario script, in 832, the adaptation engine manager 220 requests that the scenario generation unit 236 generate dialog sentences based on the text analysis result received in 816 and the environmental element setting information and the media style information received in 830. In 834, the scenario generation unit 236 sends a query about inferred sentence elements that may be used to generate dialog sentences, to the rule manager 240, and, in 836, the scenario generation unit 236 receives the inferred sentence elements from the rule manager 240.

To generate the scenario script, in 838, the adaptation engine manager 220 requests that the scenario generation unit 236 perform the process of adding detail to actions, based on the text analysis result received in 816 and the environmental element setting information and the media style information received in 830. In 840, the scenario generation unit 236 sends a query about inferred sentence elements that may be used to add details to actions to the rule manager 240. In 842, the scenario generation unit 236 receives the inferred sentence elements from the rule manager 240.

In 844, the scenario generation unit 236 generates the scenario script using the received inference results and an algorithm for setting actions and sentences to be performed by a character. The scenario generation unit 236 sends the generated scenario script to the adaptation engine manager 220.

Through the above process, the adaptation engine manager 220 may obtain the scenario script generated based on the environmental element setting information and the media style information. When the scenario script is generated, the new environmental element may be set in the process of generating dialog sentences and/or the process of adding details to actions, and the environment element setting information may be updated.

Figure 9A:
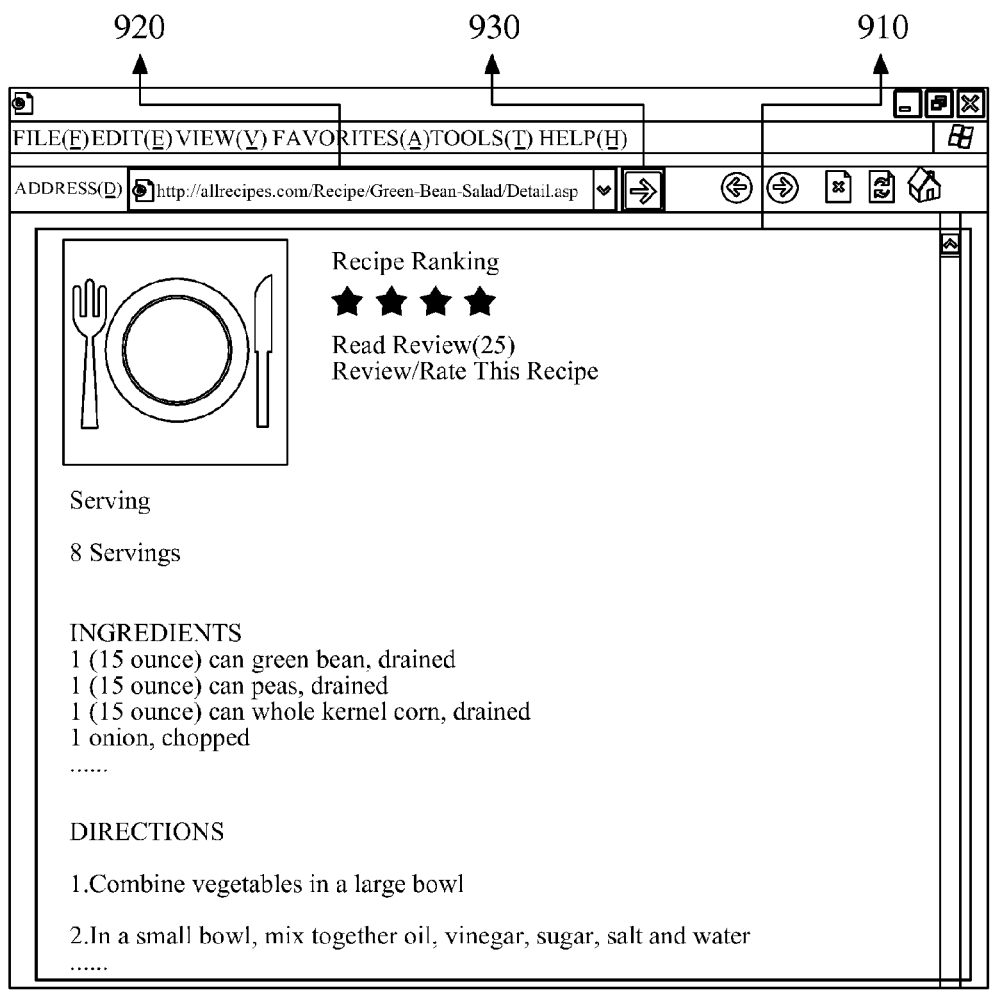
FIG. 9A illustrates an example of web text to which the methods herein may be applied.
Figure 9B:
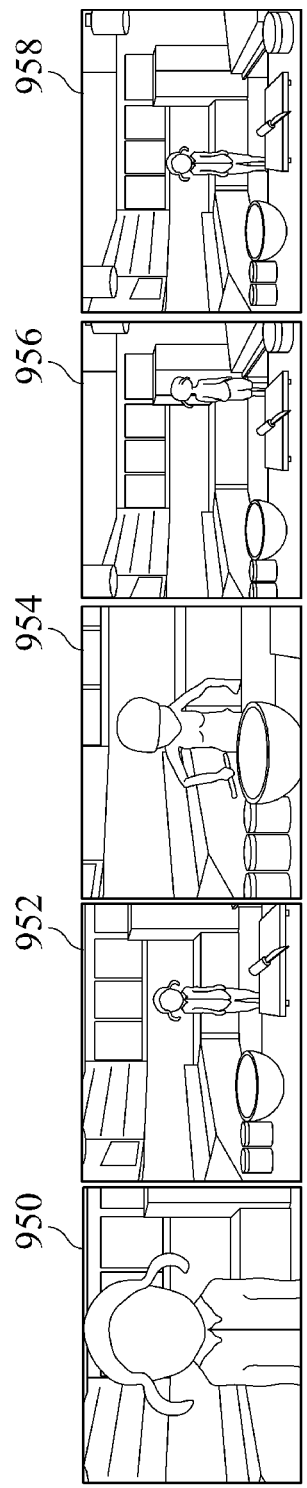
FIG. 9B illustrates an example of web service screen images obtained by applying the methods herein to web text.

FIG. 9A illustrates an example of web text to which the methods described herein may be applied. FIG. 9B illustrates an example of web service images that may be obtained by applying the methods described herein to the web text of FIG. 9A.

Referring to FIG. 9A, a web page 910 at a web address 920 may provide information, for example, information about a recipe. When an application implementing the method of FIG. 7 is executed, a user interface for creating animation from web text may be provided at a predetermined position in the web page 910. For example, an animation icon 930 may be provided at a position in the web page 910, as shown in FIG. 9A. The user interface may be used to receive a request for creation of animation from web text. Additionally, a user set theme icon (not shown) may be provided, so that a user can select a theme. The user interface may comprise, for example, a keyboard, a mouse, a touch screen, and the like.

When a user inputs a request for creation of animation from the recipe provided in the web page 910, for example, by clicking on the icon 930, information such as text and images of web text included in the web page 910 may be converted into a recipe script in a recipe domain format. The recipe script may be converted into environmental element setting information, media style information, and a scenario script as described above and then sent to and reproduced by a graphics engine. As a result, screen images 950, 952, 954, 956, and 958, may be generated as illustrated in FIG. 9B. An animation of a character making a dish according to the recipe shown in FIG. 9A may be generated. For example, an animation of a character putting various ingredients in a large bowl and mixing and chopping the ingredients, may be generated and played for a user.

Web text may be converted into a media animation script that has content that may be readily understood. Thus, web text may be shared in the form of an animation. Content creators may continue to create contents using text and images on the web as they have been doing to date. Using the apparatus and/or methods described herein, content users may reproduce the created contents in the form of an animation. For example, a method of analyzing text-based contents, such as news, scenarios, and recipes, and adapting the text-based contents using an animation-defined language are provided. Thus, content creators do not need to learn the animation-defined language or the know-how to produce animation media.

The apparatus and methods described herein may detect a domain category of the web text, for example, a recipe format, a blog format, a journey format, a news format, a scenario format, a social network format, and the like. The apparatus and methods may process the web text according to the category of web text. During the processing, the apparatus and method may extract various features from the web text, based on the category of the domain. In some embodiments, the apparatus and methods may process the web text a second time, according to the scenario domain format to clarify the subject, actions, narration, and the like. Thus, the apparatus for creating animation may extract features of domains and then compose scenarios using the extracted features.

The processes, functions, methods and/or software described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer. It will be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus configured to create an animation from a web text, the apparatus comprising:
a script formatter configured to generate a domain format script from the web text using a domain format that corresponds to a type of the web text, the type of the web text relating to a category of content of the web text;
an adaptation engine configured to generate animation contents using the generated domain format script, the animation contents comprising media style information indicating a rhythm, or an atmosphere, or initial camera walks, or any combination thereof, of the animation; and
a graphics engine configured to reproduce the generated animation contents in the form of the animation.

2. The apparatus of claim 1, wherein the script formatter is further configured to generate the domain format script such that image data from the web text is associated with text from the web text.

3. The apparatus of claim 1, further comprising:
a user interface configured to allow a user to enter a theme for the web text,
wherein the adaptation engine is further configured to generate the animation contents based on the theme set by the user.

4. The apparatus of claim 1, wherein the media style information further indicates a lighting style and/or texture styles of properties, of the animation.

5. The apparatus of claim 1, wherein the media style information further indicates a rhythm, an atmosphere, initial camera walks, a lighting style, and texture styles of properties, of the animation.

6. The apparatus of claim 1, further comprising:
a user interface for receiving a request for creation of animation based on the web text, wherein the user interface is an animation icon on a web page configured to allow a user to select the web text to be converted to the domain format script.

7. The apparatus of claim 1, wherein the domain format corresponds to at least one of a recipe format, a diary format, a news format, a scenario format, and a blog format.

8. The apparatus of claim 1, wherein the animation contents comprise:
the media style information indicating a style of the animation;
environment information about objects and settings that appear in the animation; and
a scenario script that is generated based on the environment information.

9. The apparatus of claim 8, wherein the adaptation engine is further configured to:
make inferences based on one or more predefined rules; and
update the scenario script and the environment information using the inferences.

10. The apparatus of claim 1, wherein the adaptation engine comprises:
an adaptation engine manager configured to control a process of generating the animation contents;
a text analysis unit configured to analyze text included in the domain format script;
an animation content generation unit configured to generate the animation contents based on the analyzed text; and
a rule manager configured to add detail to the animation contents using inferences made based on one or more predefined rules.

11. The apparatus of claim 10, wherein the animation content generation unit comprises:
a scenario generation unit configured to generate a scenario script used to create the animation;
a presentation style generation unit configured to generate the media style information indicating a style of the animation; and
an environmental element setting unit configured to generate environmental element setting information about objects and settings that appear in the animation.

12. The apparatus of claim 11, wherein the scenario generation unit is further configured to generate the text included in the domain format script into dialog sentences.

13. The apparatus of claim 11, wherein if the analyzed text comprises a compound verb, the scenario generation unit is further configured to generate the scenario script by converting the compound verb into a series of two or more actions.

14. The apparatus of claim 11, wherein:
the scenario generation unit is further configured to send a query about sentence elements omitted from the analyzed text to the rule manager; and
the rule manager is further configured to
infer the omitted sentence elements, and
send the inferred sentence elements to the scenario generation unit.

15. The apparatus of claim 14, wherein if environmental element setting information corresponding to the inferred sentence elements has not been set by the environmental element setting unit, the environmental element setting unit is further configured to update previously set environmental element setting information to comprise the environmental element setting information corresponding to the inferred sentence elements.

16. A method of creating an animation from a web text, the method comprising:

generating a domain format script from the web text using a domain format that corresponds to a type of the web text, the type of the web text relating to a category of content of the web text, the generating comprising extracting and classifying data of the web text according to the domain format;
generating animation contents using the generated domain format script, the animation contents comprising media style information indicating a rhythm, or an atmosphere, or initial camera walks, or any combination thereof, of the animation; and
reproducing the generated animation contents.

17. The method of claim 16, wherein the animation contents comprise:
the media style information indicating a style of animation;
environment information about objects and settings appearing in the animation; and
a scenario script that is generated based on the environment information.

18. The method of claim 16, wherein the domain format script is generated such that image data included in the web text is associated with text data included in the web text.

19. The method of claim 16, further comprising:
providing a user interface to receive a request to create the animation from the web text; and
receiving the request to create the animation from the web text.

20. The method of claim 19, wherein the user interface comprises an icon used to input the request to create the animation from the web text, and a theme icon that allows a user to select a theme.

21. The method of claim 16, wherein the generating of the animation contents comprises:
analyzing text included in the domain format script;
generating the animation contents based on the analyzed text; and
adding details to the animation contents using inferences made based on one or more predefined rules.

22. The method of claim 21, wherein the generating of the animation contents comprises:
generating a scenario script based on environment information;
making the inferences based on the one or more predefined rules; and
updating the scenario script and the environment information based on the inferences.

23. The method of claim 22, wherein the making of the inferences comprises inferring sentence elements omitted from the analyzed text based on the one or more predefined rules.

24. The method of claim 22, wherein the making of the inferences comprises:
inferring that the analyzed text comprises a compound verb; and
converting the compound verb into a series of two or more actions.

25. An apparatus configured to create an animation, the apparatus comprising:
a script formatter configured to
determine a domain format type of a web text that relates to a category of content of the web text,
extract and classify elements from the web text according to the domain format type, and
generate a domain format script according to the extracted and classified elements;
an adaption engine configured to
receive the domain format script, and generate a scenario script and animation elements according to the domain format script, the animation elements comprising media style information indicating a rhythm, or an atmosphere, or initial camera walks, or any combination thereof, of the animation; and a graphics engine configured to generate the animation using the scenario script and the animation elements.

26. The apparatus of claim 25, wherein:

the web text comprises one or more tags indicating the domain format type; and the script formatter is further configured to determine the domain format type based upon the one or more tags.

27. The apparatus of claim 25, further comprising:

a user interface configured to allow a user to enter a theme for the web text, wherein the adaptation engine is further configured to generate the scenario script and animation elements based on the theme set by the user.

28. The apparatus of claim 25, wherein the script formatter is further configured to:

generate the domain format script by processing the domain format script according to a first domain format type; and process the domain format script a second time according to a scenario domain format to further illustrate the extracted and classified elements.

29. The apparatus of claim 28, wherein the first domain format type comprises a blog domain, or a news domain, or a recipe domain, or a diary domain, or a social network environment domain.

30. The apparatus of claim 25, wherein the adaption engine comprises:

a text analysis unit configured to analyze text included in the web text, and extract sentence elements of the text using text analyzers;

an animation content generation unit configured to generate animation contents based on the analyzed text; and a rule manager comprising knowledge of ontology and relations of the analyzed text, and configured to control the animation content generation unit to generate the animation contents based on the analyzed text.

31. The apparatus of claim 30, wherein the animation content generation unit comprises:

an element setting unit configured to set information about objects and settings that appear in the animation;

a presentation style generation unit configured to generate the media style information indicating a style of the animation that is used to convert the scenario script into the animation; and a scenario generation unit configured convert the text included in the web text into dialog sentences.

32. The apparatus of claim 30, wherein:

the animation content generation unit is further configured to send a query to the rule manager that requests omitted sentence elements;

the rule manager is further configured to infer the omitted sentence elements, and send the inferred sentence elements to the animation content generation unit; and the animation content generation unit is further configured to add detail to the animation contents based on the inferred sentence elements.

33. The apparatus of claim 32, further comprising:

a storage unit configured to store one or more predefined rules that are used by the rule manager, wherein the rule manager is further configured to infer the omitted sentence elements based upon the one or more predefined rules.

* * * * *